United States Patent
Nishimura et al.

(10) Patent No.: US 10,689,509 B2
(45) Date of Patent: *Jun. 23, 2020

(54) POWDER MOLDABLE VINYL CHLORIDE RESIN COMPOSITION FOR REAL-STITCHED SURFACE SKIN AND METHOD FOR PRODUCING THE SAME, VINYL CHLORIDE RESIN MOLDED PRODUCT FOR REAL-STITCHED SURFACE SKIN AND METHOD FOR PRODUCING THE SAME, AND LAMINATE

(71) Applicant: ZEON CORPORATION, Chiyoda-ku, Tokyo (JP)

(72) Inventors: Shota Nishimura, Tokyo (JP); Takanori Fujiwara, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 172 days.

This patent is subject to a terminal disclaimer.

(21) Appl. No.: 15/519,157

(22) PCT Filed: Oct. 20, 2015

(86) PCT No.: PCT/JP2015/005285
§ 371 (c)(1),
(2) Date: Apr. 14, 2017

(87) PCT Pub. No.: WO2016/067564
PCT Pub. Date: May 6, 2016

(65) Prior Publication Data
US 2017/0233567 A1    Aug. 17, 2017

(30) Foreign Application Priority Data
Oct. 27, 2014 (JP) .................................. 2014-217926

(51) Int. Cl.
| | |
|---|---|
| C08L 27/06 | (2006.01) |
| B32B 5/18 | (2006.01) |
| B29C 41/18 | (2006.01) |
| C08K 5/12 | (2006.01) |
| C08L 83/04 | (2006.01) |
| B60K 37/00 | (2006.01) |
| B32B 27/30 | (2006.01) |
| B32B 27/40 | (2006.01) |
| B29C 41/08 | (2006.01) |
| B29C 41/00 | (2006.01) |
| B29K 27/06 | (2006.01) |
| B29L 31/30 | (2006.01) |

(52) U.S. Cl.
CPC ............ *C08L 27/06* (2013.01); *B29C 41/003* (2013.01); *B29C 41/08* (2013.01); *B29C 41/18* (2013.01); *B32B 5/18* (2013.01); *B32B 27/30* (2013.01); *B32B 27/304* (2013.01); *B32B 27/40* (2013.01); *B60K 37/00* (2013.01); *C08K 5/12* (2013.01); *C08L 83/04* (2013.01); *B29K 2027/06* (2013.01); *B29L 2031/3008* (2013.01); *B32B 2266/0278* (2013.01); *B32B 2605/003* (2013.01); *C08L 2205/025* (2013.01); *C08L 2205/03* (2013.01); *C08L 2205/035* (2013.01); *C08L 2205/06* (2013.01)

(58) Field of Classification Search
CPC ......... B32B 5/18; B32B 27/30; B32B 27/304; B29L 2031/3008; C08L 27/06
See application file for complete search history.

(56) References Cited

U.S. PATENT DOCUMENTS

| | | | | |
|---|---|---|---|---|
| 5,677,356 | A * | 10/1997 | Shimizu | ............... C08J 9/10 521/73 |
| 10,106,669 | B2 * | 10/2018 | Nishimura | ............... B29C 41/18 |
| 2006/0197321 | A1 * | 9/2006 | Saito | ....................... B60R 13/02 280/730.2 |
| 2010/0272984 | A1 * | 10/2010 | Hada | ........................ C08K 5/12 428/319.3 |
| 2015/0322244 | A1 | 11/2015 | Iwahori et al. | |

FOREIGN PATENT DOCUMENTS

| | | |
|---|---|---|
| CN | 1126220 A | 7/1996 |
| EP | 0189899 A2 | 8/1986 |
| EP | 2248854 A1 | 11/2010 |
| JP | S61174270 A | 8/1986 |
| JP | H01301743 A | 12/1989 |

(Continued)

OTHER PUBLICATIONS

May 2, 2017, International Preliminary Report on Patentability issued in the International Patent Application No. PCT/JP2015/005285.

(Continued)

*Primary Examiner* — Hai Vo
(74) *Attorney, Agent, or Firm* — Kenja IP Law PC

(57) ABSTRACT

Provided is a powder moldable vinyl chloride resin composition for a real-stitched surface skin that is capable of providing a molded product having excellent flexibility at low temperatures and real stitching properties. The powder moldable vinyl chloride resin composition for a real-stitched surface skin contains vinyl chloride resin particles (a) having an average degree of polymerization of at least 1,200 and no greater than 5,000, a trimellitate plasticizer (b), and vinyl chloride resin fine particles (c) having an average degree of polymerization of at least 1,000 and no greater than 5,000.

6 Claims, No Drawings

(56) References Cited

FOREIGN PATENT DOCUMENTS

| | | |
|---|---|---|
| JP | H02138355 A | 5/1990 |
| JP | H0426303 B2 | 5/1992 |
| JP | H04166308 A | 6/1992 |
| JP | H05279485 A | 10/1993 |
| JP | H06246761 A | 9/1994 |
| JP | H06279642 A | 10/1994 |
| JP | H0890697 A | 4/1996 |
| JP | 2007216506 A | 8/2007 |
| JP | 2011046311 A | 3/2011 |
| JP | 2011173974 A | 9/2011 |
| JP | 2012007026 A | 1/2012 |
| WO | 2009107463 A1 | 9/2009 |
| WO | 2014091867 A1 | 6/2014 |

OTHER PUBLICATIONS

Nov. 24, 2015, International Search Report issued in the International Patent Application No. PCT/JP2015/005285.

Mar. 1, 2018, Extended European Search Report issued by the European Patent Office in the corresponding European Patent Application No. 15854540.0.

* cited by examiner

POWDER MOLDABLE VINYL CHLORIDE RESIN COMPOSITION FOR REAL-STITCHED SURFACE SKIN AND METHOD FOR PRODUCING THE SAME, VINYL CHLORIDE RESIN MOLDED PRODUCT FOR REAL-STITCHED SURFACE SKIN AND METHOD FOR PRODUCING THE SAME, AND LAMINATE

TECHNICAL FIELD

This disclosure relates to a powder moldable vinyl chloride resin composition capable of providing a molded product having excellent flexibility at low temperatures and real stitching properties (resistance to cracking in a part decorated by sewing), a method for producing the powder moldable vinyl chloride resin composition for a real-stitched surface skin, a vinyl chloride resin molded product for a real-stitched surface skin obtained through powder molding of the powder moldable vinyl chloride resin composition for a real-stitched surface skin, a method for producing the vinyl chloride resin molded product for a real-stitched surface skin, and a laminate including the vinyl chloride resin molded product for a real-stitched surface skin and a foamed polyurethane molded product.

BACKGROUND

An automobile instrument panel has a structure in which a foamed polyurethane layer is disposed between a substrate and a surface skin formed from a vinyl chloride resin. Over time, the surface skin formed from the vinyl chloride resin discolors and experiences a reduction in heat aging resistance. One main cause of discoloration and so forth of the surface skin is a chemical reaction that occurs as a result of a tertiary amine used as a catalyst in formation of the foamed polyurethane layer migrating to the surface skin formed from the vinyl chloride resin. In order to prevent surface skin discoloring, a urethane integrated foamed molded product has been considered in which a granular catcher agent that captures volatile organic compounds produced in a foamed polyurethane layer and that is coated with an open cell foam sheet is provided near locations at which the edges of the foamed polyurethane layer are sealed by a surface skin and a substrate (for example, refer to PTL 1). However, there are sections where the surface skin and the foamed polyurethane layer are in contact in this urethane integrated foamed molded product and, as a result, surface skin discoloration due to the aforementioned chemical reaction cannot be prevented over a long period and heat aging resistance of the surface skin decreases.

On the other hand, a laminate has been considered in which a synthetic resin foamed layer is provided that joins a core material and a surface skin and in which the core material includes gas release holes for releasing gas produced in the foamed layer (for example, refer to PTL 2). However, the synthetic resin foamed layer and the surface skin are in contact in this laminate and, as a result, surface skin discoloration due to the aforementioned chemical reaction cannot be prevented over a long period and heat aging resistance of the surface skin decreases.

Furthermore, a molded product has been considered that includes a polyurethane molded product, a surface skin containing a vinyl chloride resin that covers at least one surface of the polyurethane molded product, and an amine catcher layer disposed between the polyurethane molded product and the surface skin (for example, refer to PTL 3). However, it is not possible to prevent migration of a tertiary amine to the surface skin formed from the vinyl chloride resin over a long period due to volatility of the amine catcher. Therefore, surface skin discoloration due to the aforementioned chemical reaction cannot be prevented over a long period and heat aging resistance of the surface skin decreases in this molded product.

On the other hand, a vinyl chloride resin composition for powder molding that includes a prescribed trimellitate plasticizer has been considered as a raw material for a surface skin of an automobile interior material (for example, refer to PTL 4). However, it is necessary to increase the blended amount of the plasticizer in order to improve heat aging resistance of a surface skin material that is obtained through powder molding of the vinyl chloride resin composition, which results in the surface skin material feeling sticky due to the plasticizer. A vinyl chloride resin composition for powder molding has also been considered that includes 100 parts by mass of vinyl chloride resin particles made from a vinyl chloride resin having an average degree of polymerization of at least 1,500 and 110 parts by mass to 150 parts by mass of a prescribed trimellitate plasticizer (for example, refer to PTL 5).

CITATION LIST

Patent Literature

PTL 1: JP 2007-216506 A
PTL 2: JP H8-90697 A
PTL 3: JP H4-26303 B
PTL 4: JP H2-138355 A
PTL 5: WO 2009/107463 A1

SUMMARY

Technical Problem

In order that fragments of a surface skin of an automobile instrument panel that is laminated with a foamed polyurethane layer are not scattered when the surface skin breaks as designed at low temperatures upon expansion of an air bag, there has been demand in recent years for an automobile instrument panel including a surface skin that has excellent flexibility at low temperatures and is resistant to cracking in a part decorated by sewing (i.e., that has excellent real stitching properties). However, is has not been possible to achieve an automobile instrument panel including a surface skin such as described above.

One problem that this disclosure aims to solve is provision of a powder moldable vinyl chloride resin composition for a real-stitched surface skin that is capable of providing a molded product having excellent flexibility at low temperatures and real stitching properties. Another problem that this disclosure aims to solve is provision of a vinyl chloride resin molded product for a real-stitched surface skin that is obtained through powder molding of the aforementioned powder moldable vinyl chloride resin composition for a real-stitched surface skin and that has excellent flexibility at low temperatures and real stitching properties, and provision of a laminate including the aforementioned vinyl chloride resin molded product for a real-stitched surface skin and a foamed polyurethane molded product.

Solution to Problem

As a result of diligent investigation conducted with the aim of solving the problems set forth above, the inventors discovered that a powder moldable vinyl chloride resin composition for a real-stitched surface skin containing vinyl chloride resin particles (a) having an average degree of polymerization of 1,200 to 5,000, a trimellitate plasticizer (b), and vinyl chloride resin fine particles (c) having an average degree of polymerization of 1,000 to 5,000 is capable of providing a molded product having excellent flexibility at low temperatures and real stitching properties. This discovery led to the present disclosure.

A presently disclosed powder moldable vinyl chloride resin composition for a real-stitched surface skin contains: vinyl chloride resin particles (a) having an average degree of polymerization of at least 1,200 and no greater than 5,000; a trimellitate plasticizer (b); and vinyl chloride resin fine particles (c) having an average degree of polymerization of at least 1,000 and no greater than 5,000.

Herein, the term "resin particles" is used to refer to particles having a particle diameter of at least 30 μm and the term "resin fine particles" is used to refer to particles having a particle diameter of less than 30 μm.

In the presently disclosed powder moldable vinyl chloride resin composition for a real-stitched surface skin, the vinyl chloride resin particles (a) preferably have an average particle diameter of at least 50 μm and no greater than 500 μm.

In the presently disclosed powder moldable vinyl chloride resin composition for a real-stitched surface skin, the vinyl chloride resin fine particles (c) preferably have an average particle diameter of at least 0.1 μm and no greater than 10 μm.

The presently disclosed powder moldable vinyl chloride resin composition for a real-stitched surface skin preferably further contains vinyl chloride resin fine particles (d) having an average degree of polymerization of less than 1,000.

In the presently disclosed powder moldable vinyl chloride resin composition for a real-stitched surface skin, the vinyl chloride resin fine particles (d) preferably have an average particle diameter of at least 0.1 μm and no greater than 10 μm.

The presently disclosed powder moldable vinyl chloride resin composition for a real-stitched surface skin preferably further contains a polar group-modified silicone oil (e).

The presently disclosed powder moldable vinyl chloride resin composition for a real-stitched surface skin is preferably used in powder slush molding.

A presently disclosed vinyl chloride resin molded product for a real-stitched surface skin is obtained through powder slush molding of the powder moldable vinyl chloride resin composition for a real-stitched surface skin described above.

It is preferable that a thread is sewn into the vinyl chloride resin molded product for a real-stitched surface skin.

The vinyl chloride resin molded product for a real-stitched surface skin is preferably for a surface skin of an automobile instrument panel.

A presently disclosed laminate includes a foamed polyurethane molded product and the vinyl chloride resin molded product for a real-stitched surface skin described above. The laminate is preferably a laminate for an automobile instrument panel.

A presently disclosed method for producing the powder moldable vinyl chloride resin composition for a real-stitched surface skin described above includes mixing the vinyl chloride resin particles (a), the trimellitate plasticizer (b), and the vinyl chloride resin fine particles (c). Moreover, the method for producing the powder moldable vinyl chloride resin composition for a real-stitched surface skin may include mixing the vinyl chloride resin particles (a), the trimellitate plasticizer (b), the vinyl chloride resin fine particles (c), and either or both of the vinyl chloride resin fine particles (d) and the polar group-modified silicone oil (e).

A presently disclosed method for producing a vinyl chloride resin molded product for a real-stitched surface skin includes powder slush molding the powder moldable vinyl chloride resin composition for a real-stitched surface skin described above or a powder moldable vinyl chloride resin composition for a real-stitched surface skin produced according to the method for producing a powder moldable vinyl chloride resin composition for a real-stitched surface skin described above.

Advantageous Effect

The presently disclosed powder moldable vinyl chloride resin composition for a real-stitched surface skin is capable of providing a molded product having excellent flexibility at low temperatures and real stitching properties.

DETAILED DESCRIPTION (Powder Moldable Vinyl Chloride Resin Composition for Real-Stitched Surface Skin)

The presently disclosed powder moldable vinyl chloride resin composition for a real-stitched surface skin contains vinyl chloride resin particles (a) having an average degree of polymerization of at least 1,200 and no greater than 5,000, a trimellitate plasticizer (b), and vinyl chloride resin fine particles (c) having an average degree of polymerization of at least 1,000 and no greater than 5,000, and may optionally further contain vinyl chloride resin fine particles (d) having an average degree of polymerization of less than 1,000, a polar group-modified silicone oil (e), and additives.

<Vinyl Chloride Resin>

Examples of vinyl chloride resins that may form the vinyl chloride resin particles (a) having an average degree of polymerization of at least 1,200 and no greater than 5,000, the vinyl chloride resin fine particles (c) having an average degree of polymerization of at least 1,000 and no greater than 5,000, and the vinyl chloride resin fine particles (d) having an average degree of polymerization of less than 1,000 include homopolymers of vinyl chloride and copolymers containing vinyl chloride units in a proportion of preferably at least 50 mass %, and more preferably at least 70 mass %. Specific examples of comonomers of vinyl chloride copolymers include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxypropyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoate and diallyldimethylammonium chloride. The above examples of monomers are merely some of the monomers (comonomers) that are copolymerizable with vinyl chloride. Further examples of various types of monomers that can be used as comonomers are provided in pages 75 to 104 of "Polyvinyl chloride" edited by the Vinyl Section of the Kinki Chemical Society Japan and published by Nikkan Kogyo Shimbun, Ltd. (1988). Any one of these monomers or any two or more of these monomers may be used. Examples of vinyl chloride resins that may form the vinyl chloride resin particles (a), the vinyl chloride resin fine particles (c), and the vinyl chloride resin fine particles (d) also include resins formed by graft polymerization of (1) vinyl chloride or (2) vinyl chloride and a comonomer such as described above with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

Conventionally known production methods such as suspension polymerization, emulsion polymerization, solution polymerization, and bulk polymerization can be used to produce the vinyl chloride resin.

In the powder moldable vinyl chloride resin composition for a real-stitched surface skin, the vinyl chloride resin particles (a) function as a matrix resin. The vinyl chloride resin fine particles (c) and the vinyl chloride resin fine particles (d) function as a dusting agent (powder fluidity modifier) described further below. It is preferable that the vinyl chloride resin particles (a) are produced by suspension polymerization. Moreover, it is preferable that the vinyl chloride resin fine particles (c) and the vinyl chloride resin fine particles (d) are produced by emulsion polymerization.

<Vinyl Chloride Resin Particles (a)>

The average degree of polymerization of a vinyl chloride resin forming the vinyl chloride resin particles (a) is at least 1,200 and no greater than 5,000, preferably at least 1,200 and no greater than 4,500, more preferably at least 1,500 and no greater than 4,500, even more preferably at least 1,500 and no greater than 4,000, particularly preferably at least 1,500 and no greater than 3,000, and most preferably at least 1,500 and no greater than 2,500. As a result of the average degree of polymerization of the vinyl chloride resin forming the vinyl chloride resin particles (a) being within any of the ranges set forth above, a vinyl chloride resin molded product for a real-stitched surface skin obtained through powder molding of the powder moldable vinyl chloride resin composition for a real-stitched surface skin can be provided with good heat aging resistance. The average degree of polymerization is measured in accordance with JIS K6720-2.

The average particle diameter of the vinyl chloride resin particles (a) is preferably at least 50 μm and no greater than 500 μm, more preferably at least 50 μm and no greater than 250 μm, and even more preferably at least 100 μm and no greater than 200 μm. As a result of the average particle diameter of the vinyl chloride resin particles (a) being within any of the ranges set forth above, powder fluidity of the powder moldable vinyl chloride resin composition for a real-stitched surface skin and smoothness of a vinyl chloride resin molded product for a real-stitched surface skin obtained through powder molding of the powder moldable vinyl chloride resin composition for a real-stitched surface skin can be improved. Herein, the term "average particle diameter" refers to the volume average particle diameter measured by a laser diffraction method in accordance with JIS Z8825.

<Vinyl Chloride Resin Fine Particles (c)>

The vinyl chloride resin fine particles (c) having an average degree of polymerization of at least 1,000 and no greater than 5,000 function as a dusting agent that improves powder fluidity of the powder moldable vinyl chloride resin composition for a real-stitched surface skin.

A vinyl chloride resin forming the vinyl chloride resin fine particles (c) normally has a degree of polymerization of at least 1,000.

The average particle diameter of the vinyl chloride resin fine particles (c) is preferably at least 0.1 μm and no greater than 10 μm. As a result of the average particle diameter of the vinyl chloride resin fine particles (c) being within the range set forth above, powder fluidity of the powder moldable vinyl chloride resin composition for a real-stitched surface skin can be improved.

The average degree of polymerization of the vinyl chloride resin forming the vinyl chloride resin fine particles (c) is preferably at least 1,200 and no greater than 5,000, more preferably greater than 1,500 and no greater than 5,000, even more preferably greater than 1,500 and no greater than 3,000, particularly preferably greater than 2,000 and no greater than 3,000, and most preferably greater than 2,000 and no greater than 2,500. As a result of the average degree of polymerization of the vinyl chloride resin forming the vinyl chloride resin fine particles (c) being within any of the ranges set forth above, flexibility at low temperatures and heat aging resistance (post-heating tensile characteristics) of a vinyl chloride resin molded product obtained through powder molding of the powder moldable vinyl chloride resin composition for a real-stitched surface skin can be improved.

In a situation in which the subsequently described vinyl chloride resin fine particles (d) having an average degree of polymerization of less than 1,000 are omitted, the content of the vinyl chloride resin fine particles (c) relative to the total (100 mass %) of the vinyl chloride resin particles (a) and the vinyl chloride resin fine particles (c) is preferably at least 5 mass % and no greater than 35 mass %, more preferably at least 5 mass % and no greater than 30 mass %, and even more preferably at least 5 mass % and no greater than 25 mass %. As a result of the content of the vinyl chloride resin fine particles (c) being within any of the ranges set forth above, powder fluidity of the powder moldable vinyl chloride resin composition for a real-stitched surface skin can be improved. Moreover, flexibility at low temperatures, heat aging resistance (post-heating tensile characteristics), and real stitching properties (performance in terms of resistance to cracking in a part decorated by sewing) of a vinyl chloride resin molded product obtained through powder molding of the powder moldable vinyl chloride resin composition for a real-stitched surface skin can be improved.

In a situation in which the subsequently described vinyl chloride resin fine particles (d) having an average degree of polymerization of less than 1,000 are omitted, the content of the vinyl chloride resin particles (a) relative to the total (100 mass %) of the vinyl chloride resin particles (a) and the vinyl chloride resin fine particles (c) is preferably at least 65 mass % and no greater than 95 mass %, more preferably at least 70 mass % and no greater than 95 mass %, and even more preferably at least 75 mass % and no greater than 95 mass %. As a result of the content of the vinyl chloride resin particles (a) being within any of the ranges set forth above, powder fluidity of the powder moldable vinyl chloride resin composition for a real-stitched surface skin can be improved. Moreover, flexibility at low temperatures, heat aging resistance (post-heating tensile characteristics), and real stitching properties (performance in terms of resistance to cracking in a part decorated by sewing) of a vinyl chloride resin molded product obtained through powder molding of the powder moldable vinyl chloride resin composition for a real-stitched surface skin can be improved.

<Vinyl Chloride Resin Fine Particles (d)>

The presently disclosed powder moldable vinyl chloride resin composition for a real-stitched surface skin preferably further contains vinyl chloride resin fine particles (d) having an average degree of polymerization of less than 1,000. The vinyl chloride resin fine particles (d) having an average degree of polymerization of less than 1,000 function as a dusting agent that improves powder fluidity of the powder moldable vinyl chloride resin composition for a real-stitched surface skin. The vinyl chloride resin fine particles (d) are distinct from the vinyl chloride resin particles (a) and the vinyl chloride resin fine particles (c).

A vinyl chloride resin forming the vinyl chloride resin fine particles (d) normally has a degree of polymerization of less than 1,000.

The average particle diameter of the vinyl chloride resin fine particles (d) is preferably at least 0.1 µm and no greater than 10 µm.

The average degree of polymerization of the vinyl chloride resin forming the vinyl chloride resin fine particles (d) is preferably at least 300 and less than 1,000, more preferably at least 500 and no greater than 950, and even more preferably at least 600 and no greater than 900. As a result of the average degree of polymerization of the vinyl chloride resin forming the vinyl chloride resin fine particles (d) being within any of the ranges set forth above, powder fluidity of the powder moldable vinyl chloride resin composition for a real-stitched surface skin can be raised, and meltability of the composition in a molding process can also be improved.

In a situation in which the powder moldable vinyl chloride resin composition for a real-stitched surface skin contains the vinyl chloride resin fine particles (d), the content of the vinyl chloride resin fine particles (d) relative to the total (100 mass %) of the vinyl chloride resin particles (a), the vinyl chloride resin fine particles (c), and the vinyl chloride resin fine particles (d) is preferably at least 2 mass % and no greater than 15 mass %, more preferably at least 3 mass % and no greater than 12 mass %, and even more preferably at least 4 mass % and no greater than 11 mass %. As a result of the content of the vinyl chloride resin fine particles (d) being within any of the ranges set forth above, powder fluidity of the powder moldable vinyl chloride resin composition for a real-stitched surface skin can be improved, and meltability of the vinyl chloride resin composition in a molding process can also be improved. Moreover, the balance of flexibility at low temperatures, heat aging resistance (post-heating tensile characteristics), and real stitching properties (performance in terms of resistance to cracking in a part decorated by sewing) of a vinyl chloride resin molded product obtained through powder molding of the powder moldable vinyl chloride resin composition for a real-stitched surface skin can be improved.

In a situation in which the powder moldable vinyl chloride resin composition for a real-stitched surface skin contains the vinyl chloride resin fine particles (d), the content of the vinyl chloride resin fine particles (c) relative to the total (100 mass %) of the vinyl chloride resin particles (a), the vinyl chloride resin fine particles (c), and the vinyl chloride resin fine particles (d) is preferably at least 3 mass % and no greater than 20 mass %, more preferably at least 5 mass % and no greater than 18 mass %, and even more preferably at least 5 mass % and no greater than 17 mass %. As a result of the content of the vinyl chloride resin fine particles (c) being within any of the ranges set forth above, powder fluidity of the powder moldable vinyl chloride resin composition for a real-stitched surface skin can be improved, and meltability of the vinyl chloride resin composition in a molding process can also be improved. Moreover, the balance of flexibility at low temperatures, heat aging resistance (post-heating tensile characteristics), and real stitching properties (performance in terms of resistance to cracking in a part decorated by sewing) of a vinyl chloride resin molded product obtained through powder molding of the powder moldable vinyl chloride resin composition for a real-stitched surface skin can be improved.

Furthermore, in a situation in which the powder moldable vinyl chloride resin composition for a real-stitched surface skin contains the vinyl chloride resin fine particles (d), the content of the vinyl chloride resin particles (a) relative to the total (100 mass %) of the vinyl chloride resin particles (a), the vinyl chloride resin fine particles (c), and the vinyl chloride resin fine particles (d) is preferably at least 65 mass % and no greater than 95 mass %, more preferably at least 70 mass % and no greater than 92 mass %, and even more preferably at least 72 mass % and no greater than 91 mass %. As a result of the content of the vinyl chloride resin particles (a) being within any of the ranges set forth above, powder fluidity of the powder moldable vinyl chloride resin composition for a real-stitched surface skin can be improved. Moreover, the balance of flexibility at low temperatures, heat aging resistance (post-heating tensile characteristics), and real stitching properties (performance in terms of resistance to cracking in a part decorated by sewing) of a vinyl chloride resin molded product obtained through powder molding of the powder moldable vinyl chloride resin composition for a real-stitched surface skin can be improved.

<Trimellitate Plasticizer (b)>

The trimellitate plasticizer (b) contained in the powder moldable vinyl chloride resin composition for a real-stitched surface skin is preferably an ester compound of trimellitic acid and a monohydric alcohol.

Specific examples of the monohydric alcohol include, but are not specifically limited to, 1-hexanol, 1-heptanol, 1-octanol, 2-ethylhexanol, 1-nonanol, 1-decanol, 1-undecanol, and 1-dodecanol.

Moreover, the trimellitate plasticizer (b) is preferably a triester compound in which substantially all the carboxy groups of trimellitic acid are esterified with the monohydric alcohol. Alcohol residue portions of the triester compound may all be derived from the same alcohol or may each be derived from a different alcohol.

The trimellitate plasticizer (b) may be one compound used individually or a mixture of different compounds.

Specific examples that are suitable for use as the trimellitate plasticizer (b) include tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, tri-n-alkyl trimellitates (esters including two or more types of alkyl groups having differing carbon numbers of 6 to 12 in molecules thereof), trialkyl trimellitates (esters including two or more types of alkyl groups having differing carbon numbers of 8 to 10 in molecules thereof), tri-n-alkyl trimellitates (esters including two or more types of alkyl groups having differing carbon numbers of 8 to 10 in molecules thereof), and mixtures of any of the preceding examples.

Specific examples that are more preferable for use as the trimellitate plasticizer (b) include tri-n-octyl trimellitate, tri(2-ethylhexyl) trimellitate, tri-n-nonyl trimellitate, tri-n-decyl trimellitate, tri-n-alkyl trimellitates (esters including two or more types of alkyl groups having differing carbon numbers of 8 to 10 in molecules thereof), and mixtures of any of the preceding examples.

The added amount of the trimellitate plasticizer (b) relative to 100 parts by mass, in total, of the vinyl chloride resin particles (a), the vinyl chloride resin fine particles (c), and the vinyl chloride resin fine particles (d), which are added as necessary, is preferably at least 70 parts by mass and no greater than 200 parts by mass, more preferably at least 75 parts by mass and no greater than 180 parts by mass, even more preferably at least 80 parts by mass and no greater than 160 parts by mass, and particularly preferably at least 80 parts by mass and no greater than 140 parts by mass. As a result of the added amount of the trimellitate plasticizer (b) being within any of the ranges set forth above, a vinyl chloride resin molded product for a real-stitched surface skin obtained through powder slush molding of the powder moldable vinyl chloride resin composition for a real-stitched surface skin can be provided with good heat aging resistance and real stitching properties (performance in terms of resistance to cracking in a part decorated by sewing). Moreover, the trimellitate plasticizer (b) is favorably absorbed by the vinyl chloride resin particles (a) and improves powder moldability of the powder moldable vinyl chloride resin composition for a real-stitched surface skin.

<Polar Group-Modified Silicone Oil (e)>

The presently disclosed powder moldable vinyl chloride resin composition for a real-stitched surface skin may contain a polar group-modified silicone oil (e). The polar group-modified silicone oil (e) is a silicone oil in which a polar group, such as a carboxyl group, a hydroxy group, a mercapto group, an amino group, an epoxy group, or a (meth)acryloyloxy group, has been introduced into a polymer having a polysiloxane structure. The "silicone oil" of the polar group-modified silicone oil (e) (i.e., silicone oil that is not modified with a polar group) may be any polymer having a polysiloxane structure without any specific limitations. Examples of polymers that can be used include polydimethylsiloxane, polydiethylsiloxane, poly(methyl ethyl) siloxane, and mixtures of any of the preceding examples. The moiety at which the polar group is introduced may be an end and/or side chain of the polymer having a polysiloxane structure.

The present description uses the term "(meth)acryloyloxy" to refer to either or both of acryloyloxy and methacryloyloxy.

Although no specific limitations are placed on the weight average molecular weight of the polar group-modified silicone oil (e), the weight average molecular weight is preferably at least 1,000 and no greater than 100,000, and more preferably at least 1,000 and no greater than 30,000.

The weight average molecular weight of the polar group-modified silicone oil (e) can be determined by the following method.

The kinematic viscosity $\eta^{CS/25}$ (units: mm$^2$/s) of the polar group-modified silicone oil (e) at 25° C. is first measured and is then used to determine the weight average molecular weight M by the following formula (I).

$$\log(\eta^{CS/25})=1.00+0.0123M^{0.5} \tag{I}$$

The kinematic viscosity $\eta^{CS/25}$ can be measured in accordance with ASTM D 445-46T using an Ubbelohde viscometer.

The added amount of the polar group-modified silicone oil (e) relative to 100 parts by mass, in total, of the vinyl chloride resin particles (a), the vinyl chloride resin fine particles (c), and the vinyl chloride resin fine particles (d), which are added as necessary, is preferably at least 0.05 parts by mass and no greater than 5 parts by mass, more preferably at least 0.1 parts by mass and no greater than 3 parts by mass, even more preferably at least 0.15 parts by mass and no greater than 1 part by mass, and particularly preferably at least 0.17 parts by mass and no greater than 0.6 parts by mass. As a result of the added amount of the polar group-modified silicone oil (e) being within any of the ranges set forth above, mold releasability of a vinyl chloride resin molded product for a real-stitched surface skin obtained through powder slush molding of the powder moldable vinyl chloride resin composition for a real-stitched surface skin is improved. Moreover, good real stitching properties (performance in terms of resistance to cracking in a part decorated by sewing) can be obtained.

<Additives>

The presently disclosed powder moldable vinyl chloride resin composition for a real-stitched surface skin may contain various additives other than the vinyl chloride resin particles (a), the trimellitate plasticizer (b), the vinyl chloride resin fine particles (c), the vinyl chloride resin fine particles (d), and the polar group-modified silicone oil (e). Although no specific limitations are placed on these additives, examples of additives that may be used include plasticizers other than the trimellitate plasticizer (b) (hereinafter, also referred to as "other plasticizers"), perchloric acid-treated hydrotalcite, zeolites, fatty acid metal salts, dusting agents (powder fluidity modifiers) other than the vinyl chloride resin fine particles (c) and the vinyl chloride resin fine particles (d) (hereinafter, also referred to as "other dusting agents"), and other additives.

[Other Plasticizers]

Specific examples of other plasticizers besides the trimellitate plasticizer (b) that may be contained in the presently disclosed powder moldable vinyl chloride resin composition for a real-stitched surface skin include primary plasticizers and secondary plasticizers such as listed below.

Examples of so-called primary plasticizers include:

pyromellitate plasticizers such as tetra-n-hexyl pyromellitate, tetra-n-heptyl pyromellitate, tetra-n-octyl pyromellitate, tetra(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl pyromellitates (esters including two or more types of alkyl groups having differing carbon numbers of 6 to 12 in molecules thereof);

epoxidized vegetable oils such as epoxidized soybean oil and epoxidized linseed oil;

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methylacetyl ricinoleate, butylacetyl ricinoleate, glyceryl monoricinoleate, and diethylene glycol monoricinoleate;

stearic acid derivatives such as n-butyl stearate and diethylene glycol distearate;

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris (chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include chlorinated paraffin, fatty acid esters of glycol such as triethylene glycol dicaprylate, butyl epoxy stearate, phenyl oleate, and methyl dihydroabietate.

Any one or any two or more of these other plasticizers may be used in the presently disclosed powder moldable vinyl chloride resin composition for a real-stitched surface skin. In a situation in which a secondary plasticizer is used, a primary plasticizer of equivalent or greater mass is preferably used in combination with the secondary plasticizer.

Among the other plasticizers listed above, pyromellitate plasticizers and epoxidized plant oils are preferable, tetra(2-ethylhexyl) pyromellitate and epoxidized plant oils are more preferable, and epoxidized soybean oil is even more preferable.

The total content of other plasticizers such as described above relative to 100 parts by mass, in total, of the vinyl chloride resin particles (a), the vinyl chloride resin fine particles (c), and the vinyl chloride resin fine particles (d), which are added as necessary, is preferably no greater than 100 parts by mass, more preferably at least 1 part by mass and no greater than 100 parts by mass, even more preferably at least 2 parts by mass and no greater than 80 parts by mass, and particularly preferably at least 3 parts by mass and no greater than 10 parts by mass.

[Perchloric Acid-Treated Hydrotalcite]

The presently disclosed powder moldable vinyl chloride resin composition for a real-stitched surface skin may contain perchloric acid-treated hydrotalcite. The perchloric acid-treated hydrotalcite can be easily produced by, for example, addition and stirring of hydrotalcite with a dilute aqueous solution of perchloric acid, followed by filtration, dehydration, and drying as necessary. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of 0.1 mol to 2 mol of perchloric acid relative to 1 mol of hydrotalcite is typical.

The substitution ratio of carbonate anions in the untreated (unsubstituted) hydrotalcite by perchlorate anions is preferably at least 50 mol %, more preferably at least 70 mol %, and even more preferably at least 85 mol %. Moreover, the substitution ratio of carbonate anions in the untreated (unsubstituted) hydrotalcite by perchlorate anions is preferably no greater than 95 mol %. As a result of the substitution ratio of carbonate anions in the untreated (unsubstituted) hydrotalcite by perchlorate anions being within any of the ranges set forth above, a vinyl chloride resin molded product for a real-stitched surface skin obtained through powder molding of the powder moldable vinyl chloride resin composition for a real-stitched surface skin can be provided with good flexibility at low temperatures.

Hydrotalcite is a non-stoichiometric compound represented by a general formula: $[Mg_{1-x}Al_x(OH)_2]^{x+}[(CO_3)_{x/2} \cdot mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2} \cdot mH_2O]^{x-}$. In the general formula shown above, x represents a number that is greater than 0 and no greater than 0.33. Natural hydrotalcite is represented by $Mg_6Al_2(OH)_{16}CO_3 \cdot 4H_2O$. On the other hand, a synthetic hydrotalcite represented by $Mg_{4.5}Al_2(OH)_{13}CO_3 \cdot 3.5H_2O$ is commercially available. Synthetic hydrotalcite can for example be synthesized by a method described in JP S61-174270 A.

The content of the perchloric acid-treated hydrotalcite relative to 100 parts by mass, in total, of the vinyl chloride resin particles (a), the vinyl chloride resin fine particles (c), and the vinyl chloride resin fine particles (d), which are added as necessary, is preferably at least 0.5 parts by mass and no greater than 7 parts by mass, more preferably at least 1 part by mass and no greater than 6 parts by mass, and even more preferably at least 1.5 parts by mass and no greater than 5.5 parts by mass. As a result of the content of the perchloric acid-treated hydrotalcite being within any of the ranges set forth above, a vinyl chloride resin molded product for a real-stitched surface skin obtained through powder molding of the powder moldable vinyl chloride resin composition for a real-stitched surface skin can be provided with good flexibility at low temperatures.

[Zeolite]

The presently disclosed powder moldable vinyl chloride resin composition for a real-stitched surface skin may contain a zeolite as a stabilizer. A zeolite is a compound represented by a general formula: $M_{x/n} \cdot [(AlO_2)_x \cdot (SiO_2)_y] \cdot zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

The content of the zeolite relative to 100 parts by mass, in total, of the vinyl chloride resin particles (a), the vinyl chloride resin fine particles (c), and the vinyl chloride resin fine particles (d), which are added as necessary, is preferably at least 0.1 parts by mass and no greater than 5 parts by mass.

[Fatty Acid Metal Salt]

The presently disclosed powder moldable vinyl chloride resin composition for a real-stitched surface skin may contain a fatty acid metal salt. The fatty acid metal salt is preferably a metal salt of a monobasic fatty acid, more preferably a metal salt of a monobasic fatty acid having a carbon number of 12 to 24, and even more preferably a metal salt of a monobasic fatty acid having a carbon number of 15 to 21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, even more preferably a metal from periods 3 to 6 of the periodic table that can produce divalent cations, and particularly preferably a metal from period 4 of the periodic table that can produce divalent cations. The fatty acid metal salt is most preferably zinc stearate.

The content of the fatty acid metal salt relative to 100 parts by mass, in total, of the vinyl chloride resin particles (a), the vinyl chloride resin fine particles (c), and the vinyl chloride resin fine particles (d), which are added as necessary, is preferably at least 0.05 parts by mass and no greater than 5 parts by mass, more preferably at least 0.1 parts by mass and no greater than 1 part by mass, and even more preferably at least 0.1 parts by mass and no greater than 0.5 parts by mass. As a result of the content of the fatty acid metal salt being within any of the ranges set forth above, a vinyl chloride resin molded product for a real-stitched surface skin obtained through powder molding of the powder moldable vinyl chloride resin composition for a real-stitched surface skin can be provided with good flexibility at low temperatures and a color difference value thereof can be reduced.

[Other Dusting Agents]

The presently disclosed powder moldable vinyl chloride resin composition for a real-stitched surface skin may contain dusting agents other than the vinyl chloride resin fine particles (c) and the vinyl chloride resin fine particles (d) (hereinafter, also referred to as "other dusting agents"). Examples of other dusting agents that can be used include inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of at least 10 nm and no greater than 100 nm are preferable.

The content of such other dusting agents is not limited to a specific range. However, the content relative to 100 parts by mass, in total, of the vinyl chloride resin particles (a), the vinyl chloride resin fine particles (c), and the vinyl chloride resin fine particles (d), which are added as necessary, is preferably no greater than 20 parts by mass, and more preferably no greater than 10 parts by mass.

[Other Additives]

The presently disclosed powder moldable vinyl chloride resin composition for a real-stitched surface skin may contain other additives such as colorants, impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, foaming agents, and β-diketones.

Specific examples of colorants include quinacridone pigments, perylene pigments, condensed polyazo pigments, isoindolinone pigments, copper phthalocyanine pigments, titanium white, and carbon black. Any one of these pigments or any two or more of these pigments may be used.

A quinacridone pigment is obtained through concentrated sulfuric acid treatment of a p-phenylene dianthranilic acid and has a hue from yellowish red to reddish purple. Specific examples of quinacridone pigments include quinacridone red, quinacridone magenta, and quinacridone violet.

A perylene pigment is obtained through a condensation reaction of perylene-3,4,9,10-tetracarboxylic anhydride and an aromatic primary amine and has a hue from red to red-purple/brown. Specific examples of perylene pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone pigment is obtained through a condensation reaction of 4,5,6,7-tetrachloroisoindolinone and an aromatic primary diamine and has a hue from greenish yellow to red/brown. A specific example of an isoindolinone pigment is isoindolinone yellow.

A copper phthalocyanine pigment is a pigment in which copper is coordinated with a phthalocyanine and has a hue from yellowish green to bright blue. Specific examples of copper phthalocyanine pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the presently disclosed powder moldable vinyl chloride resin composition for a real-stitched surface skin. Note that the impact modifier is dispersed as a heterogeneous phase of fine elastic particles in the powder moldable vinyl chloride resin composition for a real-stitched surface skin. In the powder moldable vinyl chloride resin composition for a real-stitched surface skin, polar groups and chains graft polymerized with the elastic particles are compatible with the vinyl chloride resin particles (a) and improve impact resistance of the powder moldable vinyl chloride resin composition for a real-stitched surface skin.

Specific examples of antioxidants include phenolic antioxidants, sulfuric antioxidants, and phosphoric antioxidants.

Specific examples of fungicides include aliphatic ester fungicides, hydrocarbon fungicides, organic nitrogen fungicides, and organic nitrogen sulfur fungicides.

Specific examples of flame retardants include halogen-containing flame retardants such as chlorinated paraffin; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); and gaseous foaming agents such as chlorofluorocarbons, carbon dioxide gas, water, and volatile hydrocarbons (for example pentane), and microcapsules containing any of these gaseous foaming agents.

A β-diketone can be used to more effectively suppress variation of initial color of a vinyl chloride resin molded product for a real-stitched surface skin obtained through powder molding of the presently disclosed powder moldable vinyl chloride resin composition for a real-stitched surface skin. Specific examples of β-diketones include dibenzoylmethane stearoylbenzoylmethane, and palmitoylbenzoylmethane. Any one of these β-diketones may be used individually or any two or more of these β-diketones may be used in combination.

The content of β-diketones is not limited to a specific range. However, the content of β-diketones relative to 100 parts by mass, in total, of the vinyl chloride resin particles (a), the vinyl chloride resin fine particles (c), and the vinyl chloride resin fine particles (d), which are added as necessary, is preferably at least 0.1 parts by mass and no greater than 5 parts by mass.

<Method for Producing Powder Moldable Vinyl Chloride Resin Composition for Real-Stitched Surface Skin>

The presently disclosed powder moldable vinyl chloride resin composition for a real-stitched surface skin can be produced by mixing the components described above. In other words, a method for producing the powder moldable vinyl chloride resin composition for a real-stitched surface skin includes mixing at least the vinyl chloride resin particles (a), the trimellitate plasticizer (b), and the vinyl chloride resin fine particles (c). Moreover, in a situation in which either or both of the vinyl chloride resin fine particles (d) and the polar group-modified silicone oil (e) are to be compounded, the method for producing the powder moldable vinyl chloride resin composition for a real-stitched surface skin includes mixing the vinyl chloride resin particles (a), the trimellitate plasticizer (b), and the vinyl chloride resin fine particles (c), and either or both of the vinyl chloride resin fine particles (d) and the polar group-modified silicone oil (e).

No specific limitations are placed on the method of mixing the vinyl chloride resin particles (a), the trimellitate plasticizer (b), and the vinyl chloride resin fine particles (c), and optionally the vinyl chloride resin fine particles (d), the polar group-modified silicone oil (e), and additives that are added as necessary. In one example of a preferable mixing method, components other than plasticizers and dusting agents (inclusive of the vinyl chloride resin fine particles (c) and the vinyl chloride resin fine particles (d) that are added as necessary) are mixed by dry blending, and then the plasticizers and the dusting agents are mixed in order. The dry blending is preferably carried out using a Henschel mixer. The temperature during dry blending is preferably at least 50° C. and no greater than 100° C., and more preferably at least 70° C. and no greater than 80° C.

(Vinyl Chloride Resin Molded Product for Real-Stitched Surface Skin)

The presently disclosed vinyl chloride resin molded product for a real-stitched surface skin is obtained through powder molding (preferably powder slush molding) of the presently disclosed powder moldable vinyl chloride resin composition for a real-stitched surface skin described above. The mold temperature during powder slush molding is preferably at least 200° C. and no greater than 300° C., and more preferably at least 220° C. and no greater than 280° C.

In production of the presently disclosed vinyl chloride resin molded product for a real-stitched surface skin, the presently disclosed powder moldable vinyl chloride resin composition for a real-stitched surface skin is for example sprinkled onto a mold having a temperature within any of the ranges set forth above. The powder moldable vinyl chloride resin composition for a real-stitched surface skin is initially left for at least 5 seconds and no greater than 30 seconds and, after shaking off any excess vinyl chloride resin composition, is then further left for at least 30 seconds and no greater than 3 minutes. The mold is subsequently cooled to a temperature of at least 10° C. and no greater than 60° C. and the presently disclosed vinyl chloride resin molded product for a real-stitched surface skin obtained thereby is removed from the mold.

The presently disclosed vinyl chloride resin molded product for a real-stitched surface skin is suitable for use as a surface skin of an automobile interior material such as an instrument panel or a door trim.

It is preferable that a thread is sewn into the presently disclosed vinyl chloride resin molded product for a real-stitched surface skin.

Vinyl chloride resin molded products for real-stitched surface skins into which threads are sewn are highly regarded as luxury items due to their excellent design. The color of the thread preferably differs from the color of the vinyl chloride resin molded product for a real-stitched surface skin as this can improve the design. Although no specific limitations are placed on the material of the thread, polyester is preferable.

Sewing of the thread into the vinyl chloride resin molded product for a real-stitched surface skin is preferably carried out using a needle. When a needle is used, the ease with which the real-stitched part is damaged (ease of tearing) according to the thermal history of the vinyl chloride resin molded product for a real-stitched surface skin is influenced by the type of needle that is used. For example, the vinyl chloride resin molded product for a real-stitched surface skin is damaged more easily (tears more easily) at the stitched part according to the thermal history when a needle having an approximately elliptic cross-sectional shape (also referred to as a spear-shaped needle) is used compared to when a needle having an approximately circular cross-sectional shape (also referred to as a round needle) is used. Through use of the presently disclosed powder moldable vinyl chloride resin composition for a real-stitched surface skin, it is possible to obtain a vinyl chloride resin molded product for a real-stitched surface skin that is not easily damaged (not easily torn) at a real-stitched part even when a thread is sewn into the molded product using a spear-shaped needle.

(Laminate)

The presently disclosed laminate is obtainable by stacking the presently disclosed vinyl chloride resin molded product for a real-stitched surface skin and a foamed polyurethane molded product. Examples of stacking methods that can be adopted include: a method in which the vinyl chloride resin molded product for a real-stitched surface skin and the foamed polyurethane molded product are prepared separately and are subsequently joined together by, for example, thermal fusion bonding, thermal adhesion, or using a commonly known adhesive; and a method in which raw materials of the foamed polyurethane molded product such as an isocyanate and a polyol are caused to react and polymerize on the vinyl chloride resin molded product for a real-stitched surface skin while carrying out polyurethane foaming by a commonly known method to directly form the foamed polyurethane molded product on the vinyl chloride resin molded product for a real-stitched surface skin. The latter of these methods is more suitable because it involves a simple process and enables laminates of various shapes to be obtained while ensuring reliable adhesion of the vinyl chloride resin molded product for a real-stitched surface skin and the foamed polyurethane molded product.

The presently disclosed laminate is suitable for use as an automobile interior material such as an instrument panel or a door trim.

EXAMPLES

The present disclosure is described in more detail through the following examples but is not limited to these examples.

In the following examples and comparative example, the average degree of polymerization of vinyl chloride resin particles and vinyl chloride resin fine particles was calculated by measuring the viscosity of a solution of the vinyl chloride resin particles or vinyl chloride resin fine particles dissolved in cyclohexanone in accordance with JIS K6720-2.

The average particle diameter (volume average particle diameter) of vinyl chloride resin particles and vinyl chloride resin fine particles was calculated by dispersing the vinyl chloride resin particles or vinyl chloride resin fine particles in a water tank and then using the device indicated below to measure and analyze a light diffraction-scattering intensity distribution, and thereby measure particle diameters and a volume-based particle diameter distribution.

Device: Laser diffraction particle size analyzer (SALD-2300 produced by Shimadzu Corporation)
 Measurement method: Laser diffraction and scattering
 Measurement range: 0.017 μm to 2500 μm
 Light source: Semiconductor laser (wavelength 680 nm, output 3 mW)

The weight average molecular weight M of a polar group-modified silicone oil was determined by the following formula (I) using the kinematic viscosity ($\eta^{CS/25}$ [units: mm$^2$/s]) of the polar group-modified silicone oil at 25° C., as measured in accordance with ASTM D 445-46T using an Ubbelohde viscometer.

$$\log(\eta^{CS/25}) = 1.00 + 0.0123 M^{0.5} \qquad (I)$$

Examples 1 to 3 and Comparative Example 1

Ingredients shown in Table 1 with the exception of plasticizers (trimellitate plasticizer and epoxidized soybean oil) and vinyl chloride resin fine particles used as a dusting agent were added into a Henschel mixer and mixed. The plasticizers were added to the mixture after increasing the temperature of the mixture to 80° C. and the mixture was dried up (i.e., the mixture changed to a dry state through absorption of the plasticizers by vinyl chloride resin particles). Thereafter, once the dried-up mixture had been cooled to 70° C. or lower, the vinyl chloride resin fine particles used as the dusting agent were added to the mixture to produce a powder moldable vinyl chloride resin composition for a real-stitched surface skin.

The resultant powder moldable vinyl chloride resin composition for a real-stitched surface skin was sprinkled onto a textured mold that was heated to 250° C. and after being left to melt for a time adjusted to give a vinyl chloride resin molded sheet thickness of 1 mm (specifically, 14 seconds to 17 seconds), excess vinyl chloride resin composition was shaken off. Next, the mold was placed in an oven set to 200° C. and, after being left for 60 seconds, was cooled with cooling water. Once the mold had cooled to 40° C., a vinyl chloride resin molded sheet for a real-stitched surface skin (S1) (black) of 150 mm×200 mm×1 mm was removed from the mold. Various properties of the resultant vinyl chloride resin molded sheet for a real-stitched surface skin (S1) were measured by the methods described below. The results are shown in Table 1.

The measurement methods of the various properties were as follows.

(1) Initial Tensile Test

The vinyl chloride resin molded sheet for a real-stitched surface skin (S1) was punched with a No. 1 dumbbell prescribed by JIS K6251, and tensile stress (tensile strength) and tensile elongation thereof were measured in accordance with JIS K7113 at a tension rate of 200 mm/minute and a temperature of −35° C. Note that a higher tensile elongation at −35° C. indicates that a vinyl chloride resin molded sheet has better flexibility at low temperatures.

(2) Post-Heating Tensile Test

A measurement sample was prepared as follows. Two obtained vinyl chloride resin molded sheets for a real-stitched surface skin (S1) were placed in a mold of 210 mm×300 mm×10 mm with the textured surface underneath such that the molded sheets did not overlap one another. A mixed solution was prepared by mixing polymethylene polyphenylene polyisocyanate (polymeric MDI) with a polyol mixture in a ratio determined to give an isocyanate index of 98. The polyol mixture was composed of 50 parts by mass of a propylene glycol PO (propylene oxide)/EO (ethylene oxide) block adduct (hydroxyl value 28, terminal EO unit content 10%, internal EO unit content 4%), 50 parts by mass of a glycerin PO/EO block adduct (hydroxyl value 21, terminal EO unit content 14%), 2.5 parts by mass of water, 0.2 parts by mass of an ethylene glycol solution of triethylenediamine (product name: TEDA-L33, produced by Tosoh Corporation), 1.2 parts by mass of triethanolamine, 0.5 parts by mass of triethylamine, and 0.5 parts by mass of a foam stabilizer (product name: F-122, produced by Shin-Etsu Chemical Co., Ltd.). Thereafter, the resultant mixed solution was poured onto the two vinyl chloride resin molded sheets for a real-stitched surface skin (S1) and the mold was covered with an aluminum plate of 305 mm×395 mm×2 mm to seal the mold. After 5 minutes, a sample (laminate) was formed, in the mold, of a surface skin that was formed by the vinyl chloride resin molded sheet for a real-stitched surface skin (S1) having a thickness of 1 mm and that was lined with a foamed polyurethane molded product having a thickness of 9 mm and a density of 0.18 g/cm³. The resultant sample was removed from the mold.

Next, the resultant sample was placed in an oven and was heated for 200 hours at 130° C. Thereafter, the foamed polyurethane layer was peeled from the sample to obtain a post-heating vinyl chloride resin molded sheet for a real-stitched surface skin (S2). Tensile stress (tensile strength) and tensile elongation of the post-heating vinyl chloride resin molded sheet for a real-stitched surface skin (S2) were measured at −35° C. in the same way as in the initial tensile test described above in section (1). Note that a higher tensile elongation at −35° C. indicates that a vinyl chloride resin molded sheet has better flexibility at low temperatures.

(3) Real Stitching Properties

A sewing machine having one round needle and one spear-shaped needle was used to sew two substantially parallel stitch lines using polyester resin threads (distance between threads: 10 mm, thread pitch: 4 mm, thread color: red). This was performed at substantially the same time at four locations on the vinyl chloride resin molded sheet for a real-stitched surface skin (S1) (black). As a result, a real-stitched vinyl chloride resin molded sheet for a real-stitched surface skin (S3) was obtained.

Next, an aluminum plate of 250 mm×340 mm×2 mm was placed at a lower part inside a mold of 210 mm×300 mm×10 mm. Two real-stitched vinyl chloride resin molded sheets for a real-stitched surface skin (S3) were adhered to a lid of the mold with the textured surface at an upper side (lid side) of the mold. A mixed solution was prepared by mixing polymethylene polyphenylene polyisocyanate (polymeric MDI) with a polyol mixture in a ratio determined to give an isocyanate index of 98. The polyol mixture was composed of 50 parts by mass of a propylene glycol PO/EO block adduct (hydroxyl value 28, terminal EO unit content 10%, internal EO unit content 4%), 50 parts by mass of a glycerin PO/EO block adduct (hydroxyl value 21, terminal EO unit content 14%), 2.5 parts by mass of water, 0.2 parts by mass of an ethylene glycol solution of triethylenediamine (product name: TEDA-L33, produced by Tosoh Corporation), 1.2 parts by mass of triethanolamine, 0.5 parts by mass of triethylamine, and 0.5 parts by mass of a foam stabilizer (product name: F-122, produced by Shin-Etsu Chemical Co., Ltd.). Thereafter, the resultant mixed solution was poured into the mold and the mold was sealed using the lid of the mold. After 5 minutes, a sample (laminate) was formed of a surface skin that was formed by the real-stitched vinyl chloride resin molded sheet for a real-stitched surface skin (S3) having a thickness of 1 mm, and that was lined, in order, with a foamed polyurethane molded product having a thickness of 9 mm and a density of 0.18 g/cm³ and the aluminum plate. The resultant sample was removed from the mold.

Thereafter, the resultant sample was placed in an oven set to 130° C. At 24 hour intervals (up to a maximum of 504 hours), the sample was removed from the oven and the real-stitched part of the real-stitched vinyl chloride resin molded sheet for a real-stitched surface skin (S3) was inspected for damage. The time at which damage to the real-stitched part became noticeable was taken to be the evaluation result in relation to real stitching properties. A longer time before damage to the real-stitched part becomes noticeable (i.e., slower damage to the real-stitched part) indicates better real stitching properties. In Table 1, ">504" indicates a case in which damage to the real-stitched part was not noticeable even after 504 hours.

TABLE 1

| | | Comparative Example 1 | Example 1 | Example 2 | Example 3 |
|---|---|---|---|---|---|
| Composition (parts by mass) | Vinyl chloride resin particles A[(1)] | — | 100.0 | 100.0 | 100.0 |
| | Vinyl chloride resin particles B[(2)] | 100.0 | — | — | — |
| | Trimellitate plasticizer[(3)] | 90 | 105.0 | 100.0 | 100.0 |
| | Epoxidized soybean oil[(4)] | 5.0 | 5.0 | 5.0 | 5.0 |
| | Perchloric acid-treated hydrotalcite (substitution ratio 90%)[(5)] | 4.6 | 4.6 | 4.6 | 4.6 |
| | Zeolite[(6)] | 2.4 | 2.4 | 2.4 | 2.4 |
| | Stearoylbenzoylmethane (β-diketone)[(7)] | 0.2 | 0.5 | 0.5 | 0.5 |
| | Zinc stearate[(8)] | 0.2 | 0.2 | 0.2 | 0.2 |
| | Hindered amine light stabilizer[(9)] | 0.2 | 0.2 | 0.2 | 0.2 |
| | Phosphite antioxidant[(10)] | 0.6 | 0.6 | 0.6 | 0.6 |
| | 12-Hydroxystearic acid[(11)] | 0.3 | 0.3 | 0.3 | 0.3 |
| | Silanol-modified silicone oil[(12)] | — | 0.2 | 0.2 | 0.2 |
| | Dusting agent A (vinyl chloride resin fine particles)[(13)] | 15.0 | 8.0 | 8.0 | — |
| | Dusting agent B (vinyl chloride resin fine particles)[(14)] | — | 8.0 | 8.0 | 16.0 |
| | Pigment[(15)] | 3.7 | 3.7 | 3.7 | 3.7 |
| Tensile strength (initial) (MPa) | | 23.0 | 22.5 | 23.5 | 23.5 |
| Tensile strength (after 200 hours heating) (MPa) | | 42.0 | 30.5 | 36.0 | 36.0 |
| Tensile elongation (initial) (%) | | 120 | 180 | 150 | 150 |

TABLE 1-continued

|  | Comparative Example 1 | Example 1 | Example 2 | Example 3 |
|---|---|---|---|---|
| Tensile elongation (after 200 hours heating) (%) | 20 | 90 | 50 | 50 |
| Real stitching properties (hours) | 168 | >504 | >504 | >504 |

[1]ZEST 1700Z (vinyl chloride resin particles (vinyl chloride resin particles (a)), average degree of polymerization 1,700, average particle diameter 130 μm) produced by Shin Dai-ichi Vinyl Corporation
[2]ZEST 1000Z (vinyl chloride resin particles, average degree of polymerization 1,000, average particle diameter 130 μm) produced by Shin Dai-ichi Vinyl Corporation
[3]TRIMEX N-08 produced by Kao Corporation
[4]ADK CIZER O-130S produced by ADEKA Corporation
[5]ALCAMIZER 5 produced by Kyowa Chemical Industry Co., Ltd.
[6]MIZUKALIZER DS produced by Mizusawa Industrial Chemicals, Ltd.
[7]Karenz DK-1 produced by Showa Denko K. K.
[8]SAKAI SZ2000 produced by Sakai Chemical Industry Co., Ltd.
[9]LA-72 produced by ADEKA Corporation
[10]ADK STAB 522A produced by ADEKA Corporation
[11]ADK STAB LS-12 produced by ADEKA Corporation
[12]KF-9701 (weight average molecular weight 5,000) produced by Shin-Etsu Silicone
[13]ZEST PQLTX (vinyl chloride resin fine particles (vinyl chloride resin fine particles (d)), average degree of polymerization 800, average particle diameter 2 μm) produced by Shin Dai-ichi Vinyl Corporation
[14]Ryuron paste 761 (vinyl chloride resin fine particles (vinyl chloride resin fine particles (c)), average degree of polymerization 2,100, average particle diameter 2 μm) produced by Tosoh Corporation
[15]DA PX-1720 Black (A) produced by Dainichiseika Color and Chemicals Mfg. Co., Ltd.

Molded products (vinyl chloride resin molded sheets) obtained through powder slush molding of the powder moldable vinyl chloride resin compositions for a real-stitched surface skin in Examples 1 to 3 had excellent initial and post-heating tensile characteristics at low temperatures and excellent real stitching properties.

The molded products obtained through powder slush molding of the powder moldable vinyl chloride resin compositions for a real-stitched surface skin in Examples 2 and 3 had equivalent properties. However, the powder moldable vinyl chloride resin composition for a real-stitched surface skin in Example 2 melted more easily than the powder moldable vinyl chloride resin composition for a real-stitched surface skin in Example 3, and thus had better meltability (note that this result is not tabulated).

In contrast, the molded product obtained through powder slush molding of the powder moldable vinyl chloride resin composition for a real-stitched surface skin in Comparative Example 1 had low initial and post-heating tensile elongation at low temperatures, poor initial and post-heating flexibility at low temperatures, and poor real stitching properties. Note that the powder moldable vinyl chloride resin composition for a real-stitched surface skin in Comparative Example 1 contained vinyl chloride resin particles having an average degree of polymerization that was too small and did not contain vinyl chloride resin fine particles (c) having an average degree of polymerization of at least 1,000 and no greater than 5,000.

INDUSTRIAL APPLICABILITY

The presently disclosed powder moldable vinyl chloride resin composition for a real-stitched surface skin is suitable as, for example, a molding material for a surface skin of an automobile interior material such as an instrument panel or a door trim.

The invention claimed is:

1. A powder moldable vinyl chloride resin composition for a real-stitched surface skin comprising:
   vinyl chloride resin particles (a) having an average degree of polymerization of at least 1,200 and no greater than 5,000 and an average particle diameter of at least 50 μm and no greater than 500 μm;
   a trimellitate plasticizer (b);
   vinyl chloride resin fine particles (c) having an average degree of polymerization of greater than 2500 and no greater than 5,000 and an average particle diameter of at least 0.1 μm and no greater than 10 μm,
   vinyl chloride resin fine particles (d) having an average degree of polymerization of less than 1,000 and an average particle diameter of at least 0.1 μm and no greater than 10 μm, and
   a polar group-modified silicone oil (e),
   wherein an amount of the trimellitate plasticizer (b) relative to 100 parts by mass, in total, of the vinyl chloride resin particles (a), the vinyl chloride resin fine particles (c), and the vinyl chloride resin fine particles (d) is at least 70 parts by mass and no greater than 200 parts by mass,
   an amount of the vinyl chloride resin fine particles (c) relative to 100 mass %, in total, of the vinyl chloride resin particles (a), the vinyl chloride resin fine particles (c), and the vinyl chloride resin fine particles (d) is at least 3 mass % and no greater than 20 mass %, and
   an amount of the vinyl chloride resin fine particles (d) relative to 100 mass %, in total, of the vinyl chloride resin particles (a), the vinyl chloride resin fine particles (c), and the vinyl chloride resin fine particles (d) is at least 2 mass % and no greater than 15 mass %.

2. The powder moldable vinyl chloride resin composition for a real-stitched surface skin of claim 1 used in powder slush molding.

3. A vinyl chloride resin molded product for a real-stitched surface skin obtained through powder slush molding of the powder moldable vinyl chloride resin composition for a real-stitched surface skin of claim 1.

4. The vinyl chloride resin molded product for a real-stitched surface skin of claim 3 into which a thread is sewn.

5. The vinyl chloride resin molded product for a real-stitched surface skin of claim 3 for a surface skin of an automobile instrument panel.

6. A laminate comprising:
   a foamed polyurethane molded product; and
   the vinyl chloride resin molded product for a real-stitched surface skin of claim 3.

* * * * *